May 13, 1947. A. C. KRAAYMES 2,420,433
AIRPLANE WING OF VARIABLE AREA CONSTRUCTION
Filed Jan. 17, 1946 6 Sheets-Sheet 1
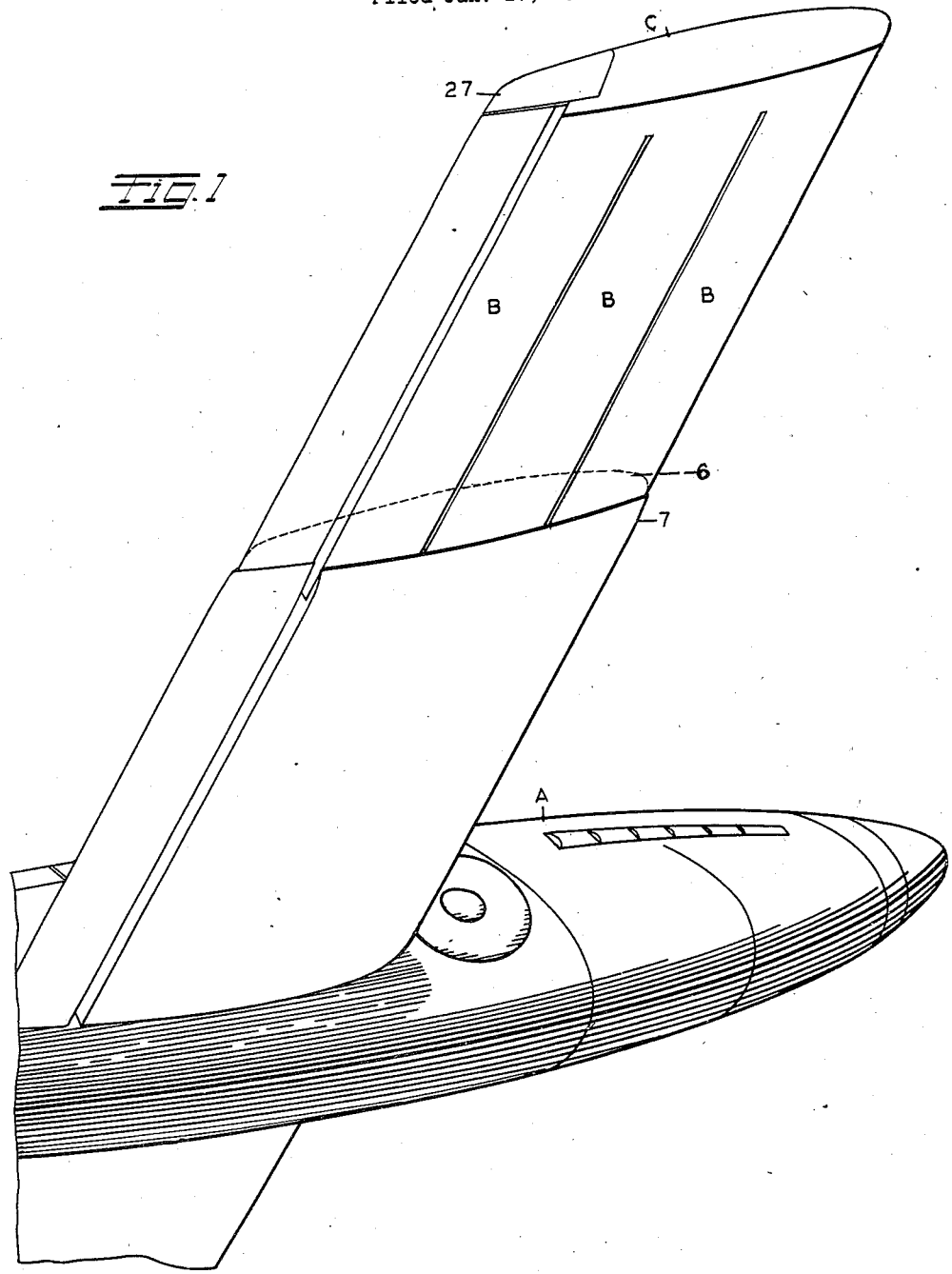
INVENTOR.
ARNOLD C. KRAAYMES
BY Edward M. Fisher

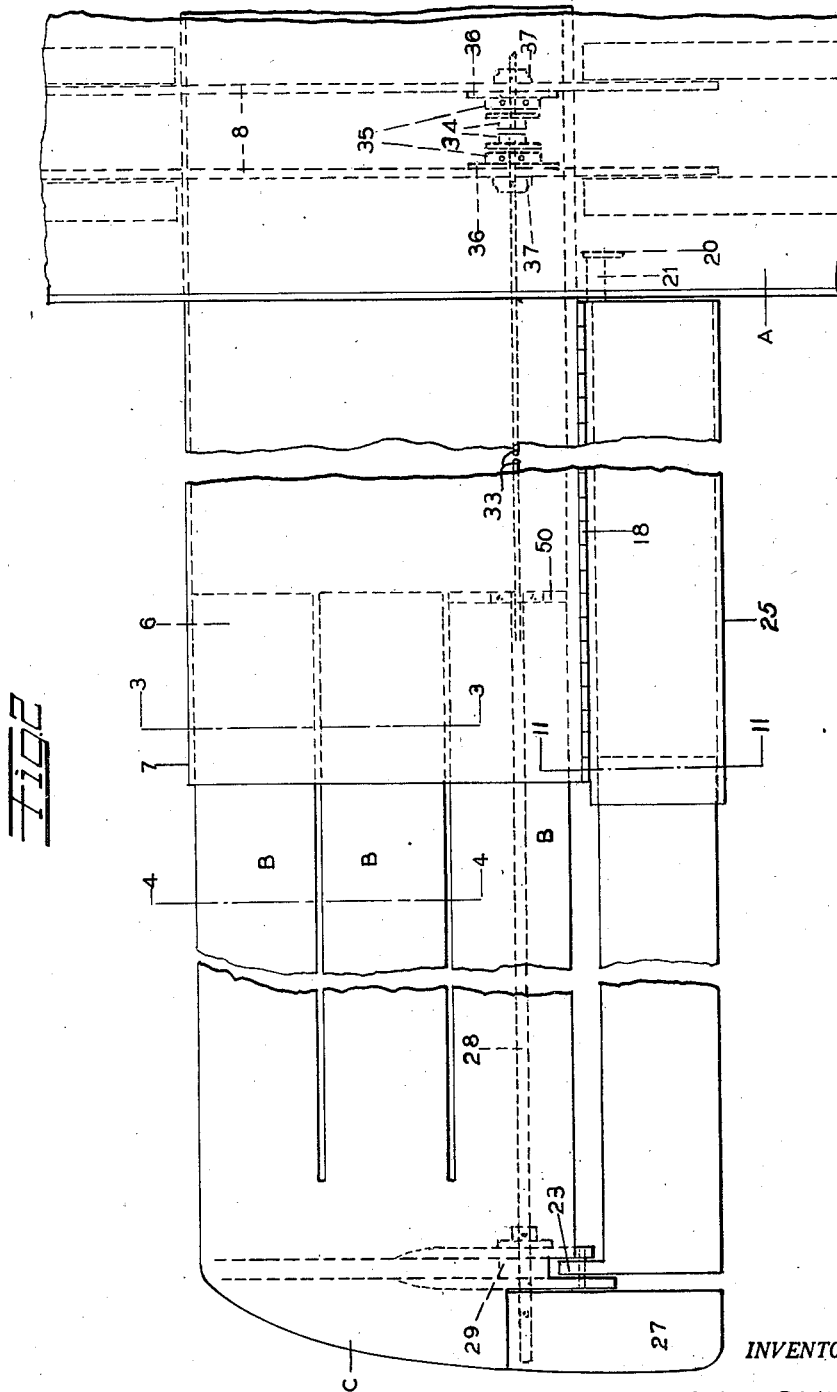

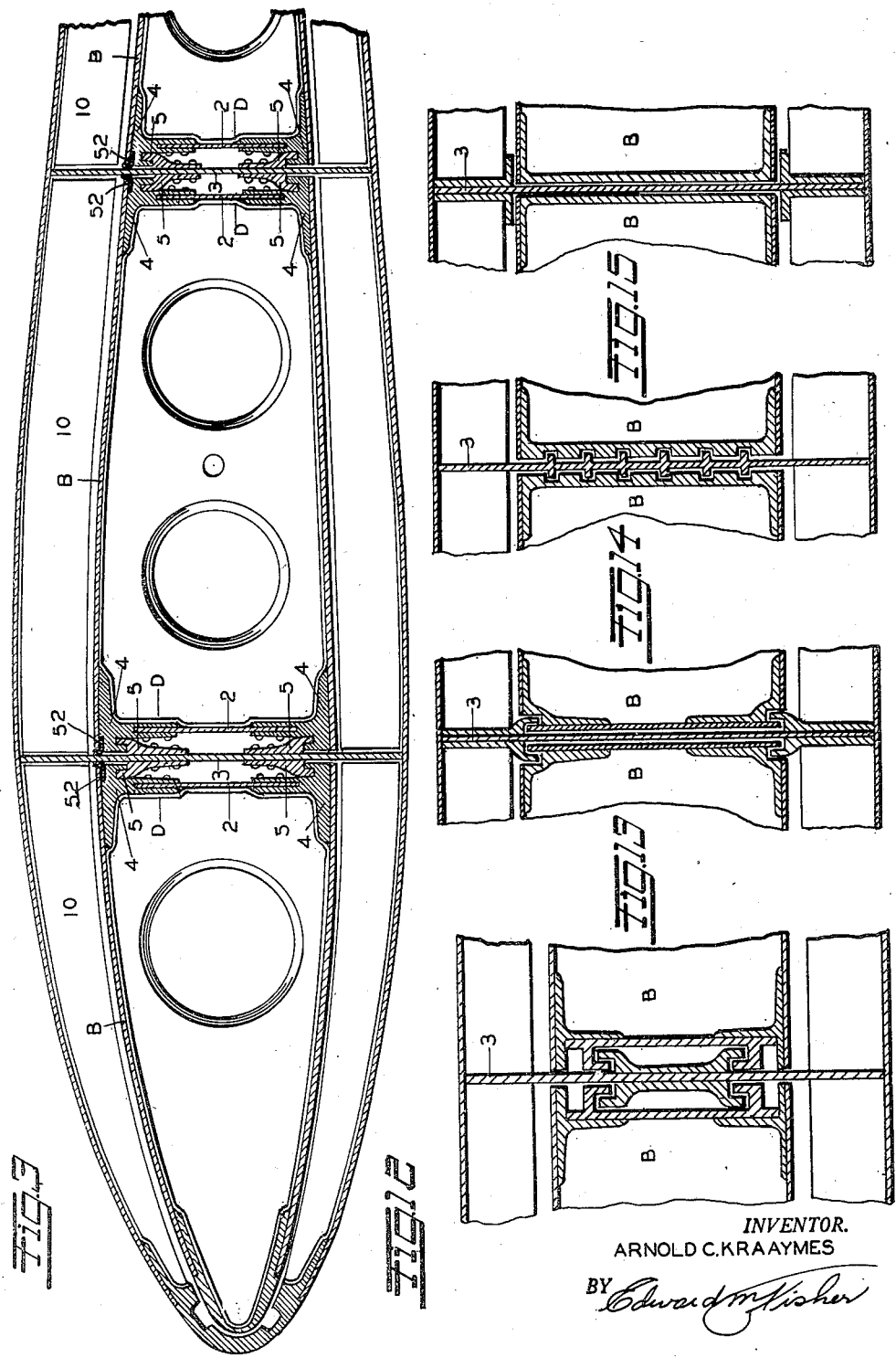

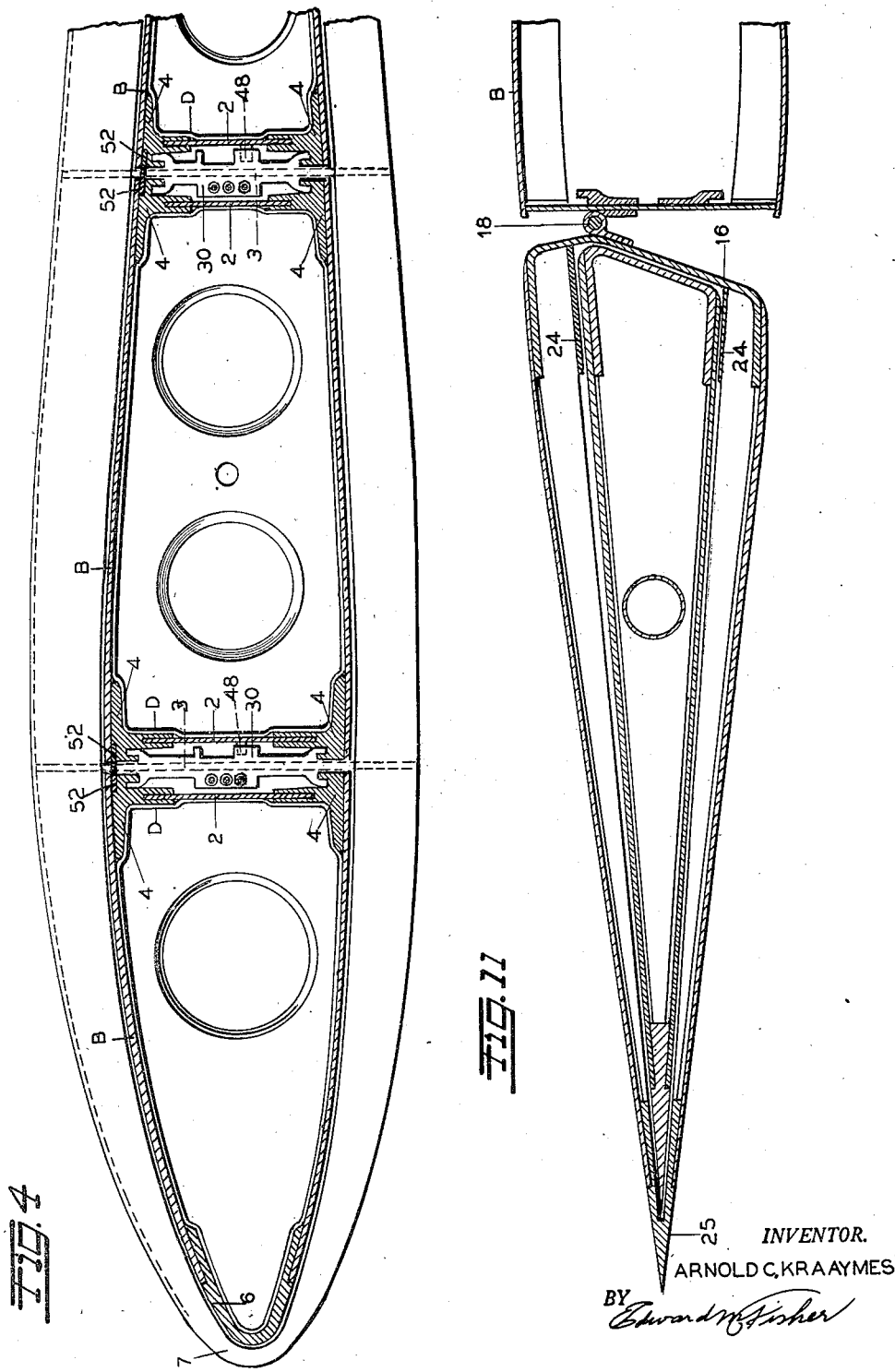

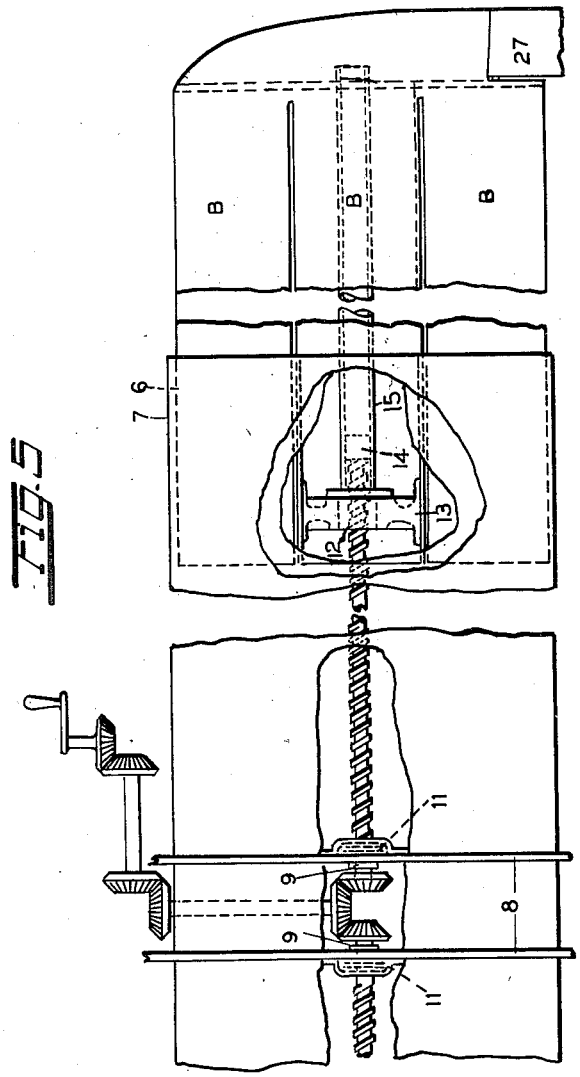

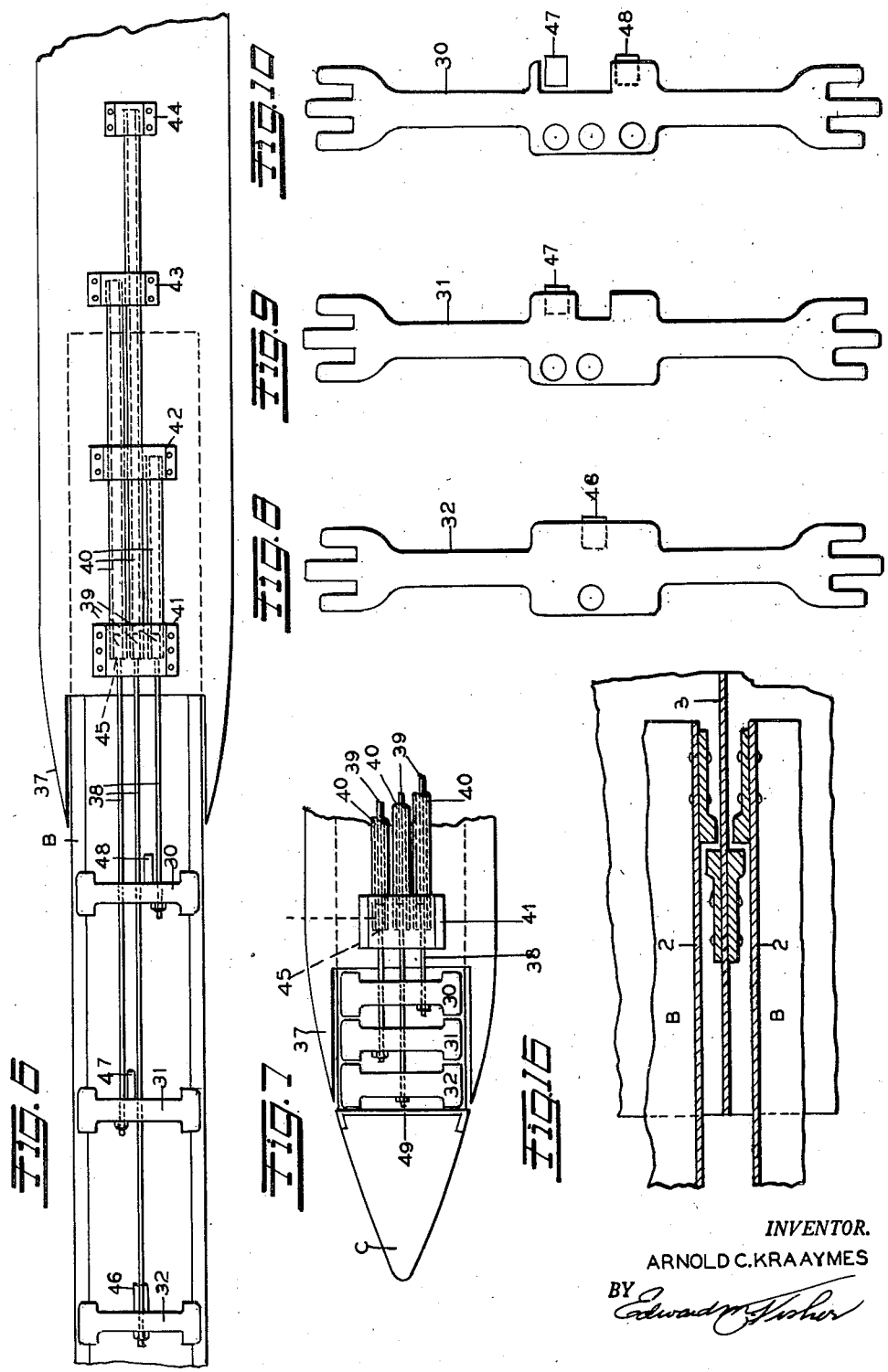

Patented May 13, 1947

2,420,433

UNITED STATES PATENT OFFICE 2,420,433

AIRPLANE WING OF VARIABLE AREA CONSTRUCTION

Arnold C. Kraaymes, Orlando, Fla., assignor of one-half to Olive May Kraaymes, Orlando, Fla.

Application January 17, 1946, Serial No. 641,741

8 Claims. (Cl. 244—43)

This invention is concerned with the provision of a retractable airplane wing, or like areodynamic elements, whereby means is established for changing the effected span and area of the wing or empennage elements of an airplane.

Broadly it is an object of this invention to provide a pilot or operator of an airplane with a range of selectivity in respect to wing span and wing area within the limits of which he can select and adjust these areas to secure the most advantageous wing loading condition with respect to the amount of load being carried or to secure such other flight conditions as are especially desirable for take off, climb, or landing.

A further object of this invention is the provision of a retractable wing which consists in general of two wing panels, or like aerodynamic surfaces, one of which, with the exception of the wing tip, can be wholly or partially retracted, by telescopement, within the other.

A further object is the provision of a retractable means for airplane wings and like aerodynamic elements wherein an aileron element is fastened to a stationary wing panel and recessed to allow a retractable aileron, which is hinged to the selector panel, to be housed within it simultaneous with the retraction of the selector panel into the stationary panel.

A further object of this invention is to provide a structure having a torque tab engaged with the tip of the selector panel wing tip, the function of which is to counteract or assist in counteracting the effects of the engine and propeller torque and to permit lateral trimming of the airplane.

A still further object of this invention is to provide an airfoil assembly being a combination of a stationary and retractable wing panels comprising a stationary wing panel with normal full depth spars continuous in web from top to bottom of the wing, the wing skin or covering at top and bottom being carried by separate rib sections of shallow depth and of such structure as to provide a series of two or more spanwise tunnels within the wing panel and a retractable wing panel made up of a series of two or more box like sections joined together at or by its wing tip to effect a single wing panel unit, the box like units each capable of being housed in retraction or telescopement within the proper designated tunnel space provided for it within the stationary wing panel, the said box like units being of such shape in transverse section as together to form an airfoil and wing element; said assembly further including a system of spanwise guide rails, tracks or shoulder sections fastened to or homologous with the spars of both stationary and retractable wing panels, designed for the function of slidably guiding the telescopable panel in spanwise movement and transferring flight and landing stresses from the spars of the telescopable panel elements to the spars of the stationary wing panel and the incorporation of a spar travel limiting stop or stops provided to prevent overtravel of the movable wing panel past the desired maximum point of extension.

This invention resides substantially in the combination, construction, arrangement and relative location of parts, all in accordance with the disclosure herein.

In the accompanying drawings,

Figure 1 is a fragmentary perspective view of an airplane and illustrating an embodiment of this invention.

Figure 2 is a fragmentary plan view of an airplane, illustrating one of oppositely disposed wings in extended position.

Figure 3 is a transverse section on line 3—3, Figure 2, illustrating a structural relation of the fixed and selector wing panels in extended position.

Figure 4, is a view similar to Figure 3 and taken on line 4—4, Figure 2.

Figure 5 is a diagrammatic plan view of a retracting and extending arrangement by which the selector panel may be moved to desired position.

Figure 6 is a partial side view, with skin removed, of the stationary and selector wing panels and wing beams in maximum extended position illustrating a manner in which the selector panel box like sections are firmly held together by catspaws or wing beam steadying blocks and further illustrating manner in which the catspaws are brought into position during extension of the selector panel.

Figure 7 is a side view, in part and with the skin removed, of stationary and selector panel beams taken at the wing tip while the wing is in maximum retracted position and illustrating the housing of the catspaws within the wing tip when wing assembly is in maximum retracted position.

Figures 8, 9, and 10 are detail face views of the respective catspaws embodied in this invention, and a diagrammatic indication of the respective creep stops associated therewith.

Figure 11 is a transverse section on the line 11—11, Figure 2, showing the housing of the telescopable aileron within the stationary wing panel aileron.

Figures 12, 13, 14 and 15 are sectional views illustrating alternate or modified spar arrangements adaptable to this invention.

Figure 16 is an enlarged detail in section showing the relation of the selector panel and stationary wing travel limit stops, when the selector panel is in extended position.

The true nature and manner of use of a retractable wing in accordance with this invention will be best understood by a detailed description of the structure thereof shown in the drawings in an illustrative sense.

Now referring more particularly to the drawings in an illustrative sense A indicates a portion of a conventional airplane fuselage having embodied therewith a wing assembly of the type covered by this invention, said wing comprising the movable panel hereinafter referred to as the selector panel.

Reference to Fig. 2 and the transverse sections, Figs. 3 and 4 show the general character of the selector panel as being a wing element made up of a series of spanwise boxlike sections B incorporated at their outer end into a wing tip structure C of normal appearance.

The spanwise sections comprising the selector panel may be single, dual, or multiple spar construction. As illustrated the spars 2 form the side walls of the respective spanwise sections which are formed over ribs D which may be of conventional design.

The stationary panel is essentially a normal wing with spar or spars 3, extended in depth from the top skin to the bottom skin of the wing. The ribs 10, however, vary from normal practice in that they are not continuous from top to bottom of the wing but consist of suitable structural elements so designed as to perform the function of giving the desired airfoil shape to the wing, to provide attachment for the wing skin or covering and to rigidly fasten the wing spar or spars together to form a proper wing assembly. The vertical depth of the rib sections is such as to leave two or more tunnels within the stationary wing deep enough and of the proper shape to permit entry of the separate spanwise elements of the selector panel. The spanwise movement of the selector panel is guided by suitable bearing surfaces, rails, track elements or shoulder sections 4 incorporated into the structure of the spanwise elements of the selector panel and into the structure of the stationary panel. In addition to the function of guiding the proper directional movement of the selector panel these guiding elements are of such nature that the stresses imposed on the spars of selector panel are transmitted to the spars or spar of the stationary wing panel by them. Fig. 3 illustrates a type of spar and spar track section 5 which may be used in the stationary wing panel. The clearance between these track bearing surfaces is just sufficient to allow spanwise movement, lubrication, and for the effects of expansion and contraction caused by heat and cold extremes liable to be encountered in operation of the aircraft. Typical variations in spar track bearing shoulder shape and structure are illustrated in Figs. 12, 13, 14, and 15, other variations in spar track or shoulder bearing arrangements may be used by substituting a small ball or roller bearing races or roller wheels fastened to one spar and running in the track or against the shoulder bearing surface of the spar or other wing unit.

The lead edge 6 of the selector wing panel may be reinforced and guided by a nose channel 7 in the leading edge of the stationary panel to provide greater steadiness by this increased bearing surface in case this is desirable in the design.

The selector panel is prevented from extension beyond a practical maximum extension by travel limiting stops fixed to the outside faces of the stationary panel spars 3 and the inside faces of the selector panel spars 2 as illustrated in detail in Fig. 16.

The stationary wing is fixed to the airplane fuselage by a large double keel or box spar 8 firmly connected to the fuselage. The spars of the stationary wing panel may pass longitudinally thru it making right and left sides of the panel one continuous element or the panel can be divided if desired into right and left elements independently fastened to the fuselage by any suitable manner.

Retraction and extension of the selector panels may be accomplished by screws, worm, chain, hydraulic piston, by gear segments and spur gears or other methods.

Power for the retraction or extension may be supplied manually, electrically, hydraulically, or by engine power. A general method for accomplishing selector panel movement is shown in Fig. 5 depicting the use of a Seller's screw supported at one end by a bearing 9 mounted in the double keel or box spar 8 and denied longitudinal movement by a thrust plate 11 which is fastened to or homologous with it. A threaded block 12 of the same character as the screw is fastened to a suitable fitting 13 which is in turn fastened to the selector panel spars of the centermost longitudinal element of selector panel. The actuating screw is provided at its outer end with an overtravel stop plug 14 of slightly larger diameter than the screw and is firmly fastened thereto or homologous with it. A housing tube 15 for the screw of a diameter suitable for slidable movement of the overtravel stop plug is provided for the support of the screw when the selector panel is not fully extended and is fastened to fitting 13 and to the wingtip.

The aileron used is made up of two major elements one of which is telescopable within the other, these two elements forming a long aileron assembly reaching from the fuselage to the wingtip. The element nearest the fuselage 16 is fastened directly to the stationary panel by hinge 18 and is so designed that a tunnel is provided for the housing of the associated aileron element, which is designed to be telescopable within it. This telescopable element is fastened to the selector at its outer end by a hinge hanger whose hinging center-line coincides with the center line of the stationary panel aileron hinge 18. The selector panel aileron is closely and accurately guided within the stationary panel aileron by bearing strips 24 which are fastened to the stationary panel aileron structure and by the cutout provided in the trailing edge 25 of the stationary panel aileron. Pivotal movement of the aileron assembly upon the hinge 18 is effected by an aileron actuating or control horn 20 mounted on a tubular or similar extension 21 which fastens it to the stationary panel aileron and allows extension of the aileron horn thru a suitable cut out in the side of the fuselage to a position within the fuselage proper.

To effectively counteract engine and propeller torque this invention incorporates a special torque tab 27 at the trailing edge of each movable wing panel wing tip which may be set by the aircraft operator differentially or together at a proper torque counteracting angle. In Fig. 2 is illustrated one means for mounting and operation of the tab, wherein, the tab is mounted on a square tubing 28 which is in turn mounted within the selector panel in bearings 29 and 50 and prevented from spanwise movement by the hinge yoke. The selector panel torque tab is rotatably actuated by a smaller square tube 33 on the inner end of which is mounted the torque tab actuating horn 34. The actuating tube 33 rotates at its inner end within a bearing 35 which is mounted in a case 36 fixed to the stationary wing panel fuselage mounting keel 8. Spanwise motion of the actuating tube is prevented by the horn collar in conjunction with collar 37 mounted on the outerside of the double keel.

To further a stiff selector panel structure, the separate spanwise elements of the selector panel are tied together and thereby prevented from independent movement by a series of slidable selector panel catspaws such as shown in Figs. 8, 9, and 10. These selector panel catspaws are brought into their selected positions during extension of the wing thru the spanwise movement of the selector panel and effectively ties the sections into a homogeneous unit.

In order to attain an uninterrupted wingtip contour with the stationary panel during retraction of the selector panel the upper and lower surfaces of the stationary panel are extended as at 37 past the outer end of the spars 3 of the stationary wing.

Extension of the selector panel from retracted position effects outward movement and positioning of the catspaw elements, this being accomplished through the action of the catspaw creep stops 46, 47 and 48; the latter being affixed to the selector panel spars each engages the rear face of its proper catspaw and pushes it into its proper position between the segments of the movable wing. Over-travel is prevented by the pull-out rod 38 attached to each cats paw, the pull-out rods having a plug or piston 39 of larger diameter than the rod itself and being housed during the retracted stage in suitable tubes 40 fastened to the stationary panel spar web by suitable blocks or brackets 41, 42, 43, and 44 to prevent same from dangling within the wing when the selector panel is not extended sufficiently to pull them out. The pull out housing tube block 41 nearest the stationary panel wing tip provides sockets suitable to firmly hold the housing tubes and differs from other tube housing blocks in that the end nearest the wingtip ends in a solid face or shoulder 45 drilled just large enough to allow the pull out rod to slide therethru. Therefore when the selector panel and its housed catspaws move outward in extension of the panel, the pull out rods will follow until prevented from further outward movement when the pull out rod plugs 39 contact the shoulders or face of the outermost pull out housing tube block 41 which action completes the positioning of that particular catspaw on the selector panel spar track.

When the selector panel is fully extended the catspaws are prevented from possible motion toward the wing root by creep stops 46, 47, and 48. During the outward movement of the selector panel, creep stop 46 advances thru the gaps in catspaws 30 and 31 and when the spar is in maximum extension butts up against the rear face of catspaw 32 as indicated at 46, Fig. 8. Catspaw 31 is prevented from retrograde movement by creep stop 47 which clears the gap in catspaw 30 and then moves outward with its spar until it is in contact with the rear face of the catspaw 31. Similarly catspaw 30 is held against retrograde movement by creep stop 48 at the place indicated in Fig. 10.

During retraction of the selector panel the catspaws will be gathered into the wingtip housing section by the retracting movement of the selector panel sections and the inward urging of a spar tip end flange 49 which pushes the pull out rods into their respective housing tubes.

Provision for closing of the gap between the separate spanwise elements of the selector panel is afforded by the use of rubber like or other flexible material gap closing strips 52 which are fastened to the elements under the skin, and extended inward therefrom to a gap center as shown, said strips being preferably fixed to the elements by screws to permit replacement, however, any other suitable means may be employed such as clamping, and the like. With this structure the normal position of the strips is as shown in Fig. 2, however, as the selector panel is retracted the strips are bent upward by contact with the spars 3 provided with suitable cam faces to effect the upward bending movement.

From the above description it will be apparent to those skilled in the art that the details of construction illustrated herein may readily be varied without departure from the novel subject matter herein disclosed. I do not, therefore, desire to be strictly limited by the disclosure but rather by the claims granted me.

What is claimed is:

1. An airfoil construction having a fixed portion comprising a wing envelope structure, web spars extending continuously from bottom to top of said envelope throughout the major portion of its length and forming spanwise extending compartments, a movable wing section comprising separate spanwise box-like portions together forming a spanwise slotted airfoil adapted to be received within said compartments, said box-like sections including oppositely located spanwise extending structural supporting members in each of the several box-like sections, interengaging means between said members and said web spars for guiding said slotted airfoil for sliding movement into and out of the fixed portion, and an integral wing tip common to the slotted airfoil section and holding the said box-like sections in fixed relation.

2. In the combination defined by claim 1, a stiffening means slideably mounted on said spanwise extending structural members, said stiffening means engaging and holding adjacent spanwise members in rigid relation when said movable wing section is extended.

3. In the combination defined by claim 1, a stiffening means slideably mounted on said spanwise extending structural members, said stiffening means engaging and holding adjacent spanwise members in rigid relation when said movable ring section is extended, means for housing said stiffening means within said fixed portion when said movable wing section is in retracted position.

4. In the combination defined by claim 1, a stiffening means slideably mounted on said spanwise extending structural members, said stiffening means engaging and holding edjacent spanwise members in rigid relation when said movable wing section is extended, means for housing said stiffening means within said fixed portion when said movable wing section is in retracted position, mechanism connecting said stiffening means and said fixed portion, and means integral with said stiffening means and engageable with said movable wing section for automatically positioning the stiffening means spanwise of the said structural supporting members in extended position.

5. In the combination defined by claim 1, said interengaging means including spar track sections mounted on said web spars and track bearings integral with said members.

6. An airfoil construction having a fixed portion comprising a wing envelope structure, web spars extending continuously from bottom to top of said envelope throughout the major portion of its length and forming spanwise extending compartments, a movable wing section comprising separate spanwise box-like portions together forming a spanwise slotted airfoil adapted to be received within said compartments, said box-like sections including adjacent spanwise extending structural supporting members in each of the several box-like sections, guiding means between said members and said web spars for guiding said slotted airfoil for sliding movement into and out of the fixed portion, said guiding means including shoulder sections mounted on said web spars against the faces of which the elements of the movable panel box-like portions slideably bear, and an integral wing tip common to the slotted airfoil section and holding the said box-like sections in fixed relation.

7. An airfoil construction having a fixed portion comprising a wing envelope structure, web spars extending continuously from bottom to top of said envelope throughout the major portion of its length and forming spanwise extending compartments, a movable wing section comprising separate spanwise box-like portions together forming a spanwise slotted airfoil adapted to be received within said compartments, said box-like sections including adjacent spanwise extending structural supporting members in each of the several box-like sections, interengaging means between said members and said web spars for guiding the movement of the said slotted airfoil into and out of the fixed portion, said interengaging means including spar track sections mounted on said web spars and track bearings integral with said members, and provided with anti-friction bearings, an integral wing tip common to the slotted airfoil section and holding the said box-like sections in fixed relation, a stiffening means slideably mounted on anti-friction bearings on said spanwise extending structural members, said stiffening means engaging and holding adjacent spanwise members in rigid relation when said movable wing section is extended, means for housing said stiffening means within said fixed portion when said movable wing section is in retracted position, mechanism connecting said stiffening means and said fixed portion, and means integral with said stiffening means and engageable with said movable wing section for automatically positioning the stiffening means spanwise of the said structural supporting members in extended position.

8. In aircraft an airfoil comprising fixed wing sections and movable wing sections having ailerons and arranged for spanwise telescopic movement in said fixed sections, in combination, integral wing tips on said movable wing sections, pivotally mounted trim tabs at the trailing edge of said wing tips and mechanism for controlling said tabs differentially or together in retracted or extended positions of said movable wing sections, specifically to counteract the effects of engine and propeller torque.

ARNOLD C. KRAAYMES.

REFERENCES CITED

The following references are of record in the file of this patent:

UNITED STATES PATENTS

| Number | Name | Date |
|---|---|---|
| 2,405,726 | Zap | Aug. 13, 1946 |
| 1,752,554 | Gerbracht | Apr. 1, 1930 |
| 1,982,242 | Bellanca | Nov. 27, 1934 |
| 2,222,997 | Bellanca | Nov. 26, 1940 |
| 1,833,995 | Jensen | Dec. 1, 1931 |